July 13, 1926.
F. G. SCHWARTZ
COMBINED DISH PAN AND DRAINER
Filed August 11, 1925     2 Sheets-Sheet 1
1,592,709
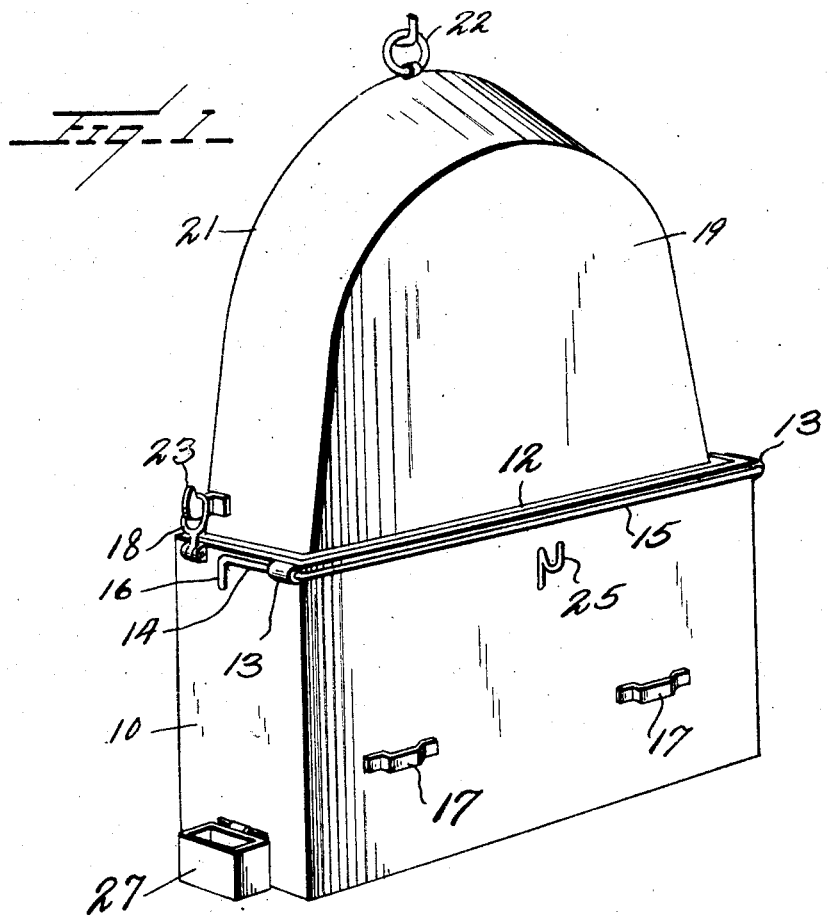
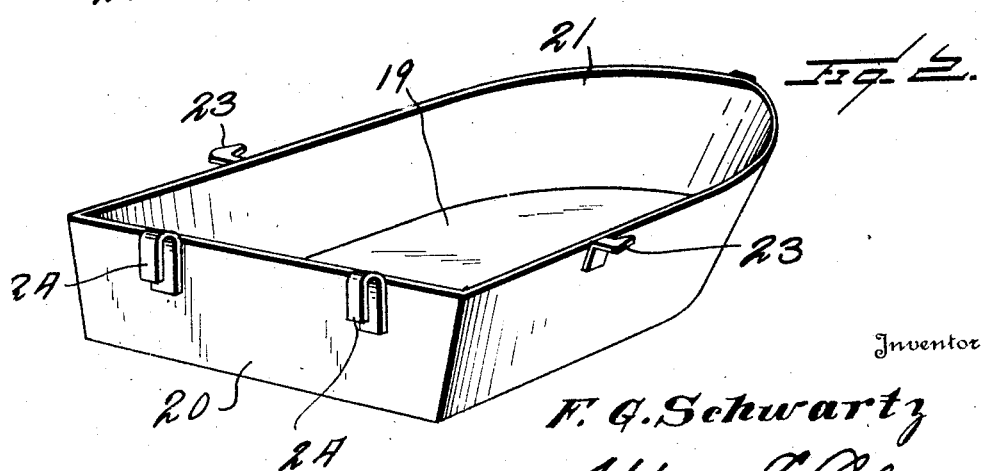
Inventor
F. G. Schwartz
By Watson E. Coleman
Attorney July 13, 1926.
F. G. SCHWARTZ
COMBINED DISH PAN AND DRAINER
Filed August 11, 1925
1,592,709
2 Sheets-Sheet 2
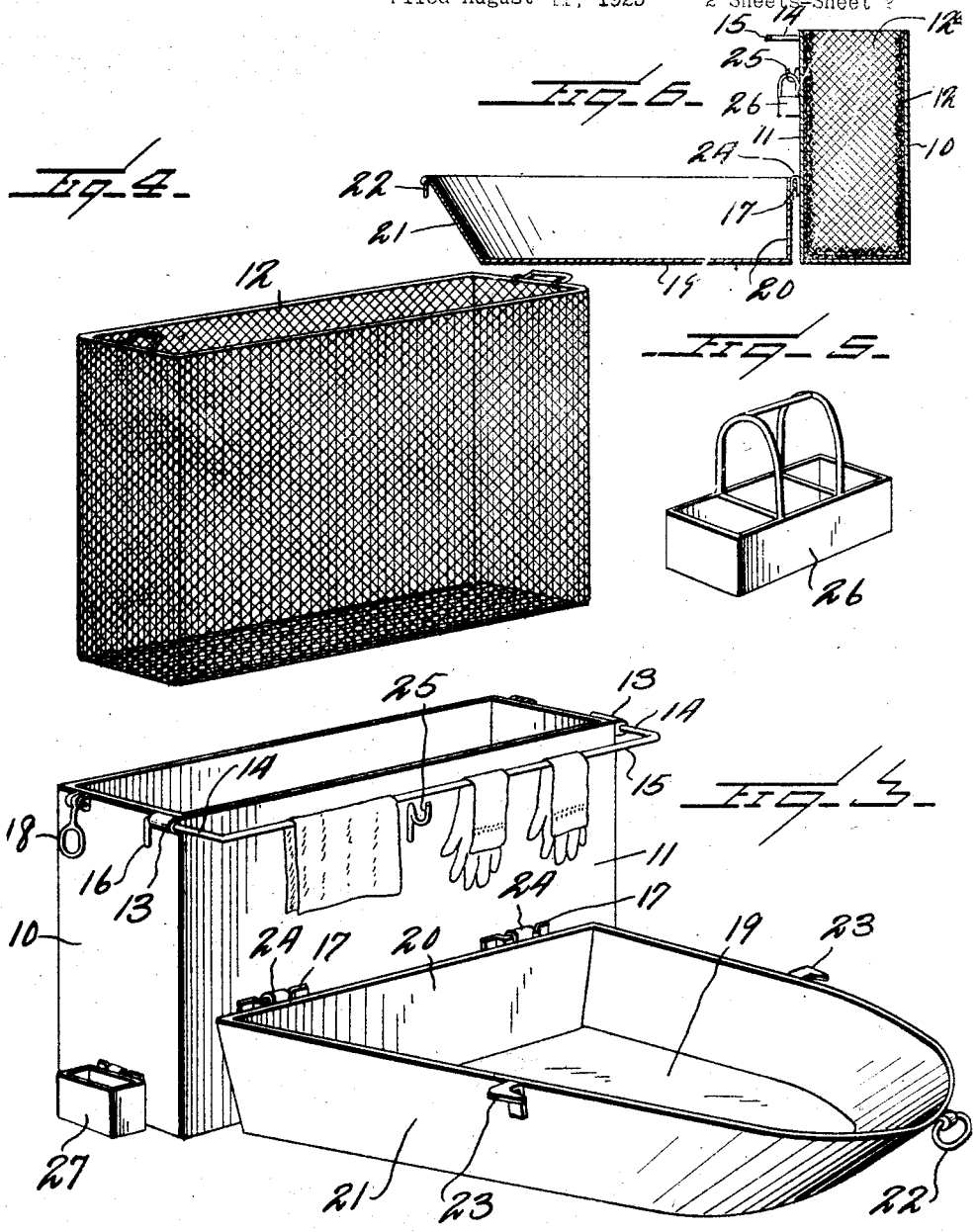

Patented July 13, 1926.

1,592,709

UNITED STATES PATENT OFFICE.

FREDERICK G. SCHWARTZ, OF COLUMBUS, OHIO.

COMBINED DISHPAN AND DRAINER.

Application filed August 11, 1925. Serial No. 49,622.

This invention relates to household articles, and particularly to dish pans and drainers such as are used for washing dishes and culinary utensils.

One of the objects of the invention is to provide a drain pan and drainer and a dish pan coacting therewith so constructed that the drain pan and foraminous drainer basket may have inserted therein the dish pan when the dish washing operation is through with, the dish pan engaging the drain pan to thus permit the dish pan and drain pan to be hung up as a unit.

A further object is to provide a drain pan of this character having the dish pan so constructed that it may be attached to the drain pan and project therefrom in convenient relation thereto.

A still further object is to provide a drain pan with a foraminous drainer so constructed that the foraminous drainer may be withdrawn from the drain pan to thereby permit the dishes to dry without the necessity of wiping them.

Other objects have to do with the details of construction and arrangement of parts as will appear more fully hereinafter.

My invention is illustrated in the accompanying drawings, wherein:—

Figure 1 is a perspective view of a combined dish washer and drain pan in nested position;

Figure 2 is a perspective view of the dish pan;

Figure 3 is a perspective view of the drainer pan and the dish pan connected thereto, the drain basket being removed;

Figure 4 is a perspective view of the drain basket;

Figure 5 is a perspective view of a small basket for containing soap powders and the like;

Figure 6 is a vertical sectional view through the connected drainer pan, drainer basket and dish pan.

Referring to these drawings, 10 designates a drain pan, as it may be called, which is rectangular in form, open at the top, and has the front wall 11. Insertable within this drain pan is a drainer 12 also rectangular in form to fit the drain pan and formed of wire netting or interwoven metal strips or rods. The end walls of the drain pan adjacent their upper ends are formed to provide sleeves 13 and disposed in said sleeves are the angularly bent ends 14 of a longitudinally extending rod 15. The ends 14 are provided with stops 16 at their extremities and this rod 15 may thus be shoved inward or drawn outward, as desired, within certain limits. This rod is designed to support dish towels, dish rags, rubber gloves or the like. The front wall 11 of the drain pan 10 is formed with the straps 17 and the end walls of the drain pan adjacent their upper edges are provided with the outwardly projecting loops 18 preferably pivoted.

The dish pan is designated 19 and is approximately semi-circular in form, having a bottom, the upwardly extending end wall 20 which is disposed at right angles to the bottom of the pan and extends transversely across the pan, and the side wall 21 which is arcuate in plan and flares upwardly somewhat. This side wall is formed at that portion opposite the wall 20 with the loop, ring or eye 22, and opposite portions of the side wall between the end wall 20 and the loop 22 are formed with the outwardly projecting hooks 23. The end wall of the dish pan is formed with the downwardly projecting hooks 24, which hooks 24 are adapted to engage in or with the straps 17 and thus the dish pan when so engaged will be supported on the front wall of the drain pan and extend out therefrom. This is the position occupied by the dish pan when it is being used.

Preferably the drain pan will also be provided with a hook 25 upon which a basket 26 which may contain flake soap, washing powders or the like may be disposed, and preferably the wall of the pan will be provided with means for supporting a cake of soap in the form of a soap box, designated 27. Obviously, I do not wish to be limited to the minor conveniences or devices which may be supported upon the drain pan 10.

In the use of this device, the dish pan has its hooks 24 engaged with the straps 17. The reticulated drainer 12 is disposed within the drain pan 10. As fast as the dishes are washed in the dish pan they are placed within the drain pan, that is, within the drainer 12, and the drain pan is either previously or afterwards filled with boiling water. After the dishes have been completely washed, the drainer 12 may be lifted out of the drain pan, the water, of course, passing off into the drain pan, and the mass of dishes may then be allowed to dry by evaporation. When the dishes within the drainer 12 have been dried by evaporation they are removed and the drainer put back within the drain pan, the water having been discharged therefrom. The dish pan may be then inserted within the drain pan and the hooks 23 are engaged with the loops 18 and the whole device hung up upon a single nail engaged by the loop or hanger 22.

It is to be understood that while I have heretofore referred to a single drainer 12 as being disposed within the drain pan, that as a matter of fact two drainers of wire netting 12 and 12$^a$, as shown in Figure 6, are used, one nested within the other. This, of course, is merely for convenience so that when one is filled with dishes and the hot water poured on, that one is taken out and while the dishes are drying a second container 12$^a$ is filled with dishes and inserted within the drain pan. Obviously the dishes may be inserted in the drainer either when the drainer is within the drain pan or the drainer may be first filled with dishes and then inserted within the drain pan.

It will be seen that this device is very simple, convenient and compact. It will also be seen that, if desired, a plurality of of drainer baskets 12 may be used nested one inside the other.

While I have illustrated certain details of construction and arrangement of parts, I do not wish to be limited to this as it is obvious that many changes might be made in these details without departing from the spirit of the invention as defined in the appended claims.

I claim:—

1. A dish washing and draining device comprising a drain pan rectangular in plan having a front and a rear wall and two end walls, the end walls being relatively narrow, and a dish pan having an extreme width approximately equal to the width of the interior of the drain pan and being insertible within the drain pan, said dish pan having a flat wall at one end adapted to be disposed adjacent to the front wall of the drain pan, said flat wall having means whereby it may be engaged with the front wall of the drain pan and extend out therefrom at right angles thereto, and means on the drain pan and dish pan whereby the latter may be held in detachable interlocked engagement with the former, the dish pan having means whereby it may be supported in a depending position and thus support the drain pan.

2. A dish washing and draining device comprising a drain pan having upwardly extending loops at its ends, and a dish pan insertible into the drain pan, the dish pan having a flat end wall having means whereby it may be engaged with and against the front wall of the drain pan and extend out horizontally therefrom and having hooks whereby it may be engaged with said loops on the drain pan when the dish pan is inserted within the same, the dish pan having a loop whereby it may be supported and thus support the drain pan.

3. A device for washing dishes and draining the same comprising a drain pan rectangular in plan and having a front wall, a rear wall, and two end walls, the end walls having upwardly extending loops, and the front wall having a plurality of straps thereon, and a dish pan having a width approximately equal to the length of the drain pan and a depth approximately equal to the width of the drain pan whereby the dish pan may be inserted within the drain pan, the dish pan having a flat end wall formed with hooks to engage said straps when this end wall is abutted against the front wall of the drain pan, the side wall of the dish pan being formed with two hooks at opposite portions thereof adapted to engage said loops on the drain pan when the dish pan is disposed within the drain pan, the dish pan at the opposite end from said flat wall being formed with a loop whereby it may be supported to thereby support the drain pan.

4. A dish washing and draining device comprising a drain pan rectangular in plan and having a front and a rear wall and two end walls, the drain pan being longer than it is deep, and a dish pan, the dish pan having a flat end wall and having an extreme width approximately equal to the length of the drain pan and a depth approximately equal to the width of the drain pan whereby said dish pan may be inserted within the drain pan, the dish pan having means whereby it may be detachably engaged with the drain pan when so inserted, the dish pan having means whereby it may be supported to thus support the drain pan when the dish pan is inserted therein.

5. A dish washing and draining device comprising a drain pan and a dish pan, the dish pan being insertible within the drain pan and having means whereby it may be engaged with the drain pan to support the latter when so inserted, said dish pan having means whereby it may be supported upon a nail.

In testimony whereof I hereunto affix my signature.

FREDERICK G. SCHWARTZ.